(12) United States Patent
Yoon et al.

(10) Patent No.: US 11,188,078 B2
(45) Date of Patent: Nov. 30, 2021

(54) APPARATUS FOR AUTOMATICALLY PARKING VEHICLE IN PERSONAL GARAGE, SYSTEM INCLUDING THE SAME, AND METHOD FOR THE SAME

(71) Applicants: Hyundai Motor Company, Seoul (KR); Kia Motors Corporation, Seoul (KR)

(72) Inventors: Dae Joong Yoon, Whasung-Si (KR); Sun Wo Jung, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 286 days.

(21) Appl. No.: 16/412,605

(22) Filed: May 15, 2019

(65) Prior Publication Data

US 2020/0183388 A1 Jun. 11, 2020

(30) Foreign Application Priority Data

Dec. 5, 2018 (KR) .......................... 10-2018-0155474

(51) Int. Cl.
*G05D 1/00* (2006.01)
*G05D 1/02* (2020.01)

(52) U.S. Cl.
CPC ......... *G05D 1/0088* (2013.01); *G05D 1/0055* (2013.01); *G05D 1/0212* (2013.01); *G05D 1/0246* (2013.01); *G05D 1/0255* (2013.01); *G05D 1/0276* (2013.01)

(58) Field of Classification Search
CPC .. G05D 1/0088; G05D 1/0055; G05D 1/0212; G05D 1/0246; G05D 1/0255; G05D 1/0276
USPC .......................................................... 701/26
See application file for complete search history.

(56) References Cited

U.S. PATENT DOCUMENTS

| | | | | |
|---|---|---|---|---|
| 2013/0117078 | A1* | 5/2013 | Weik, III | ................ E05F 15/70 705/13 |
| 2016/0288833 | A1* | 10/2016 | Heimberger | ............ G08G 1/168 |
| 2017/0334380 | A1* | 11/2017 | Bonnet | .................... B60Q 1/02 |
| 2018/0165637 | A1* | 6/2018 | Romero | ............ G06Q 10/0833 |
| 2018/0194344 | A1* | 7/2018 | Wang | .................... G05D 1/0257 |
| 2018/0281858 | A1* | 10/2018 | Griffith | ................ G05D 1/0234 |
| 2018/0322775 | A1* | 11/2018 | Chase | .................... G06N 5/003 |

\* cited by examiner

*Primary Examiner* — Yazan A Soofi
(74) *Attorney, Agent, or Firm* — Morgan, Lewis & Bockius LLP (57) ABSTRACT

An apparatus for automatically parking a vehicle in a personal garage, a system including the same, and a method for the same, may include a processor to determine whether generation of a parking path is possible in a space around a personal garage, when receiving a request for parking in the personal garage, to determine vehicle parking information when the generation of the parking path is possible, to provide the determined vehicle parking information to a vehicle, and to control opening or closing of a personal garage door, and a storage to store image data of a surrounding environment of the personal garage and the vehicle parking information determined by the processor.

18 Claims, 10 Drawing Sheets

APPARATUS FOR AUTOMATICALLY PARKING VEHICLE IN PERSONAL GARAGE, SYSTEM INCLUDING THE SAME, AND METHOD FOR THE SAME

CROSS-REFERENCE TO RELATED APPLICATION

The present application claims priority to Korean Patent Application No. 10-2018-0155474, filed on Dec. 5, 2018, the entire contents of which is incorporated herein for all purposes by this reference.

BACKGROUND OF THE INVENTION

Field of the Invention

The present invention relates to an apparatus for automatically parking a vehicle in a personal garage, a system including the same, and a method for the same, and more particularly to a technology of controlling automatic parking of a vehicle in a personal garage.

Description of Related Art

Recently, as a technology of automatically parking a vehicle or a parking assist technology has been developed, a vehicle system may control the parking of the vehicle.

To park the vehicle in a narrow space, such as a personal garage, in a residential area having personal garages located in a row, a driver or a vehicle system has to inconveniently perform several manipulation stages.

In other words, conventionally, since the driver or the vehicle system has to locate the vehicle at a restricted position or a specified stopping position, the driver or the vehicle system has to inconveniently perform parking controlling along a defined parking path from a relevant position after opening a garage door and searching for a parking space.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus configured for automatically parking a vehicle in a personal garage and a method for the same, configured for automatically controlling the parking of the vehicle in the personal garage as the vehicle system and a home line system operate together.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus may include a processor to determine whether generation of a parking path is possible in a space around a personal garage, when receiving a request for parking in the personal garage, to determine vehicle parking information when the generation of the parking path is possible, to provide the determined vehicle parking information to a vehicle, and to control opening or closing of a personal garage door, and a storage to store image data of a surrounding environment of the personal garage and the vehicle parking information determined by the processor.

According to an exemplary embodiment of the present invention, the processor may detect whether an approaching object is present around the personal garage, when receiving a parking commencement signal from the vehicle, and may provide, to the vehicle, approaching information related to the object when the approaching object is detected.

According to an exemplary embodiment of the present invention, the processor may control the opening of the personal garage door when the vehicle arrives at an entrance of the personal garage, and may control the closing of the personal garage door when parking of the vehicle is finished in the personal garage.

According to an exemplary embodiment of the present invention, the processor may recalculate the vehicle parking information, and may provide a result of recalculating the vehicle parking information to the vehicle, when the vehicle arrives at an entrance of the personal garage.

According to an exemplary embodiment of the present invention, the processor may include transmit a text message for a notification to a user terminal when the generation of the parking path is difficult or the parking of the vehicle is finished.

According to an exemplary embodiment of the present invention, the vehicle parking information may include information on a current location of the vehicle and a relative angle of the vehicle based on a vertical line extending from an entrance of the personal garage.

According to an exemplary embodiment of the present invention, the processor may determine whether generation of the parking path is possible, depending on whether an obstacle is present in the space around the personal garage.

According to an exemplary embodiment of the present invention, the processor may perform user authentication by use of an identifier (ID) of each personal garage and an ID of each user, when a plurality of personal garages are provided.

According to various aspects of the present invention, an apparatus may include a processor to determine whether generation of a parking path is possible in a space around a personal garage, to determine vehicle parking information when the generation of the parking path is possible, to generate the parking path based on the vehicle parking information, and to control parking of a vehicle and a storage to store the vehicle parking information and the parking path obtained through the processor.

According to an exemplary embodiment of the present invention, the apparatus may further include a display to display a notification when the generation of the parking path is difficult or when the parking of the vehicle is finished.

According to an exemplary embodiment of the present invention, the processor may notify commencement of parking controlling by transmitting a parking commencement signal to a device which controls opening of a personal garage door, when commencing the parking controlling.

According to an exemplary embodiment of the present invention, the processor may detect whether an approaching object is present around the personal garage, after parking controlling is commenced, and correct the parking path or stop the parking controlling, when the approaching object is detected.

According to an exemplary embodiment of the present invention, the processor may recalculate the vehicle parking information, and correct the parking path, when the vehicle arrives at an entrance of the personal garage.

According to an exemplary embodiment of the present invention, the vehicle parking information may include information on a current location of the vehicle and a relative angle of the vehicle with respect to a vertical line extending from an entrance of the personal garage.

According to an exemplary embodiment of the present invention, the processor may include determine whether the generation of the parking path is possible, depending on whether an obstacle is present in the space around the personal garage.

According to various aspects of the present invention, a method for controlling parking in a personal garage may include receiving a request for the parking in the personal garage, determining whether generation of a parking path is possible in a space around the personal garage, determining vehicle parking information when the generation of the parking path is possible, providing the vehicle parking information to a vehicle, and controlling opening of a personal garage door when the vehicle arrives in front of the personal garage.

According to an exemplary embodiment of the present invention, the method may further include performing user authentication when the request for the parking in the personal garage is received.

According to an exemplary embodiment of the present invention, the determining of whether the generation of the parking path is possible may include determining whether the generation of the parking path is possible, depending on whether an obstacle is present in the space around the personal garage.

According to an exemplary embodiment of the present invention, the determining of the vehicle parking information may include determining information on a current location of the vehicle and a relative angle of the vehicle with respect to a vertical line extending from an entrance of the personal garage.

According to an exemplary embodiment of the present invention, the method may further include controlling the opening of the personal garage door when the vehicle arrives at an entrance of the personal garage, recalculating the vehicle parking information, providing the vehicle parking information to the vehicle, and controlling closing of the personal garage door when the parking of the vehicle is finished in the personal garage.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to accompanying drawings. In the drawings, the same reference numbers will be used throughout to designate the same or equivalent elements. Furthermore, a detailed description of well-known features or functions will be ruled out in order not to unnecessarily obscure the subject matter of the present invention.

In describing components of exemplary embodiments of the present invention, the terms $1^{st}$, $2^{nd}$, first, second, A, B, (a), (b), and the like may be used herein. These terms are only used to distinguish one component from another component, but do not limit the corresponding components irrespective of the order or priority of the relevant components. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present invention includes a configuration of controlling automatic parking by generating a parking path as a home link system and a vehicle system are operate together to automatically park the vehicle in a personal garage.

Hereinafter, embodiments of the present invention will be described in detail with reference to FIGS. 1 to 10.

Figure 1:
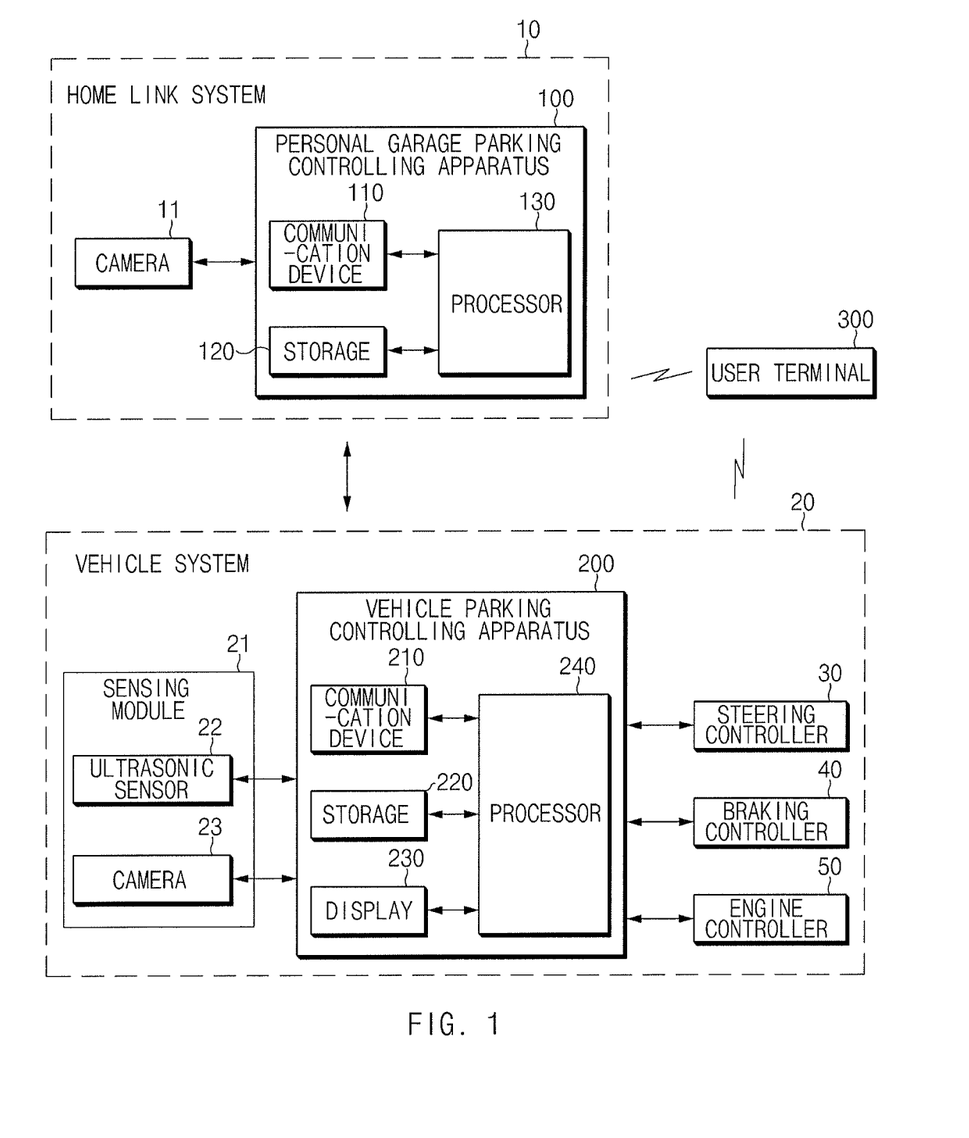
FIG. 1 is a block diagram illustrating the configuration of a system for personal garage parking controlling, according to an exemplary embodiment of the present invention.

FIG. 1 is a block diagram illustrating the configuration of a system for personal garage parking controlling, according to an exemplary embodiment of the present invention.

Referring to FIG. 1, according to an exemplary embodiment of the present invention, the system for personal garage parking controlling may automatically control the parking of the vehicle in the personal garage through the internetworking between a home link system 10 to manage the personal garage and a vehicle system 20 disposed in the vehicle.

The home link system 10 may include a camera 11 and an apparatus (hereinafter, referred to as "personal garage parking controlling apparatus") 100 for controlling the parking of the vehicle in the personal garage. The camera 11 is disposed at an upper portion of a personal garage door to capture an image of a space in front of the personal garage. Furthermore, a plurality of cameras 11 may be provided and may include separate cameras to capture images of the internal to the personal garage as well as the upper side of the personal garage door. The cameras 11 may be implemented with a closed circuit television (CCTV). In the instant case, the home link system 10 may receive, from a user terminal 300, a request (hereinafter, referred to as "garage parking request") for parking the vehicle in the parking garage or may transmit, to the user terminal 300, a notification that the personal garage door is open or that parking is finished, through a text message.

The personal garage parking controlling apparatus 100 may determine whether generation of a parking path is possible in a space around the personal garage when receiving the garage parking request, may determine vehicle parking information when the generation of the parking path is possible, may provide the vehicle determination information to the vehicle, and may control the opening or closing of the personal garage door.

The personal garage parking controlling apparatus 100 may include a communication device 110, a storage 120, and a processor 130.

The communication device 110 is a hardware device implemented with various electronic circuits to transmit and receive a signal through wireless connection or wired connection. According to an exemplary embodiment of the present invention, the communication device 110 may perform wireless communication with the vehicle system 20 and the user terminal 300.

The storage 120 may store image data obtained through the camera 11, and a vehicle location, information on a relative angle, and a parking path, which are obtained through the processor 130. The storage 120 may be implemented with at least one storage medium of a flash type memory, a hard disk type memory, a micro type memory, a card type memory (e.g., a Security Digital (SD) card or an eXtreme digital card), a Random Access Memory (RAM), a Static Random Access Memory (SRAM), a Read Only Memory (ROM), a Programmable Read Only Memory (PROM), an Electrically Erasable and Programmable ROM (EEPROM), a magnetic RAM (MRAM), a magnetic disk, and an optical disk-type memory.

The processor 130 may be electrically connected to the communication device 110 and the storage 120, and the like, may electrically control each component, and may be an electric circuit that executes software commands. Accordingly, the processor 130 may perform various data processing and determination, to be described below.

The processor 130 may determine whether the generation of a parking path is possible in a space around a personal garage when receiving the personal garage parking request from the user terminal 300, may determine vehicle parking information when the generation of the parking path is possible, may provide the determination information to the vehicle, and may control the opening or closing of the personal garage door.

The processor 130 may determine whether the generation of the parking path is possible depending on whether an obstacle is present in the space around the personal garage.

The processor 130 may detect whether there is present an approaching object around the personal garage, when receiving a signal for commencing parking from the vehicle and may provide, to the vehicle, information on the approaching of the object when the approaching object is detected.

The processor 130 may control the opening of the personal garage door when the vehicle arrives at the entrance of the personal garage, may control the closing of the personal garage door when the parking of the vehicle is finished in the personal garage, and may notify, to the user terminal 300, the opening or closing of the personal garage door, through a text message.

The processor 130 may recalculate the vehicle parking information and may provide the recalculation result to the vehicle, when the vehicle arrives at the entrance of the personal garage. In the instant case, the vehicle parking information may include information on a current location of the vehicle and a relative angle of the vehicle with respect to a vertical line extending from the entrance of the personal garage.

The processor 130 may transmit a text message for a notification to the user terminal 300 when the generation of the parking path is difficult or the parking of the vehicle is finished.

A processor 240 may perform user authentication by use of an identifier (ID) of each personal garage and an ID of each user, which are previously registered, when a plurality of personal garages is present. In other words, the processor 240 may perform the user authentication by receiving an ID of each personal garage and an ID of each user from the user terminal 300, which has requested for parking the vehicle in the personal garage, and by comparing the received ID of each personal garage and the received ID of each user with a previously-stored ID of each personal garage and a previously-stored ID of each user, respectively.

According to an exemplary embodiment of the present invention, the vehicle system 20 may perform the personal garage parking controlling based on a remote smart parking assist (RSPA). The vehicle system 20 may control the parking of the vehicle in the personal garage by internetworking with the home link system 10.

Referring to FIG. 1, according to an exemplary embodiment of the present invention, the vehicle system 20 may include a vehicle parking controlling apparatus 200, a sensing module 21, a steering controller 30, a braking controller 40, and an engine controller 50.

The vehicle parking controlling apparatus 200 may determine whether the generation of a parking path is possible in a space around the personal garage, may determine the vehicle parking information when the generation of the parking path is possible, and may generate the parking path based on the vehicle parking information, performing the controlling of the parking of the vehicle.

The vehicle parking controlling apparatus 200 may include a communication device 210, a storage 220, a display 230, and a processor 240.

The communication device 210 is a hardware device implemented with various electronic circuits to transmit and receive a signal through wireless or wired connection. According to an exemplary embodiment of the present invention, the communication device 210 may perform wireless communication with the home link system 10 and the user terminal 300. To the present end, the communication device 210 may include various communication devices such as a mobile communication device, a broadcast receiving device such as a digital multimedia broadcasting (DMB) module or a digital video broadcasting-handheld (DVB-H) module, a short-range communication device such as a ZigBee module or a near field communication (NFC) module, which is a Bluetooth module, and a Wi-Fi communication device.

The storage 220 may store a sensing result of the sensing module 21, and a vehicle location, a relative angle of a vehicle based on the entrance of the personal garage, a parking path, and detection information related to an external object, which are obtained from the processor 240. The storage 220 may include a memory of the same type as that of the storage 120 described above.

The display 230 may display a parking path or a parking path in which an external object is involved. The display 230 may be implemented with a head up display (HUD), a cluster, an audio video navigation (AVN), or the like. Furthermore, the display 230 may include at least one of a liquid crystal display (LCD), a thin film transistor-liquid crystal display (TFT LCD), a light emitting diode (LED), an organic light-emitting diode (OLED), an active matrix OLED (AMOLED), a flexible display, a bended display, and a third dimension (3D) display. Among them, some displays may be implemented with transparent displays configured in a transparent type or a light transparent type such that the displays are viewed from the outside. Furthermore, the display 230 is implemented with a touchscreen including a touch panel to be used as an input device in addition to an output device.

The processor 240 may be electrically connected to the communication device 210, the storage 220, and the display 230, may electrically control each component, and may be an electric circuit that executes software commands. Accordingly, the processor 240 may perform various data processing and determination, to be described below.

The processor 240 may determine whether the generation of a parking path is possible in a space around the personal garage, may determine the vehicle parking information when the generation of the parking path is possible, may generate the parking path based on the vehicle parking information, and may perform the parking controlling for the vehicle.

The processor 240 may determine whether the generation of the parking path is possible, depending on whether an obstacle is present in the space around the personal garage.

The processor 240 may notify the commencement of parking controlling by transmitting a parking commencement signal to the home link system 10 which controls the opening of the personal garage door, when the parking controlling is commenced.

The processor 240 may detect whether there is present an object approaching around the personal garage, when the parking controlling is commenced. The processor 240 may correct the parking path based on the location of the approaching object or may temporarily stop the parking controlling and subsequently perform the parking controlling after the object passes by, when the approaching object is detected.

The processor 240 may recalculate the vehicle parking information and may correct the parking path, when the vehicle arrives at the entrance of the personal garage. In the instant case, the vehicle parking information may include information on a current location of the vehicle and the relative angle of the vehicle based on a vertical line extending from the entrance of the personal garage.

The processor 240 may generate the parking path based on the vehicle parking information when receiving the vehicle parking information from the home link system 10 and may perform the parking controlling along the parking path.

The sensing module 21 may obtain information on an image of a space for generating a parking path in front of the personal garage and the sensing result of whether an obstacle is present. To the present end, the sensing module 21 may include an ultrasonic sensor 22 and a camera 23.

Ultrasonic sensors 22 are provided at the front, left, right, and rear portions of the vehicle to detect a space (a space for a parking path), obstacles, and the like around the vehicle and to provide the sensing result to the vehicle parking controlling apparatus 200.

Cameras 23 are provided at the front, left, right, and rear portions of the vehicle to capture images of the space around the vehicle and to provide the images to the vehicle parking controlling apparatus 200.

Although FIG. 1 illustrates that the sensing module 21 includes the ultrasonic sensor 22 and the camera 23 by way of example, the present invention is not limited thereto. For example, the sensing module 21 may include a plurality of sensors to detect an object and a space outside the vehicle. Furthermore, the sensing module 21 may include radar, a laser scanner and/or corner radar, a LiDAR, an acceleration sensor, a yaw rate sensor, a torque measurement sensor and/or a wheel speed sensor, a steering angle sensor, or the like, in addition to the ultrasonic sensor 22 and the camera 23.

Furthermore, according to an exemplary embodiment of the present invention, the current location of the vehicle may be estimated by use of the ultrasonic sensor 22 and the camera 23 such that the current location is used to generate the parking path. Furthermore, the sensing module 21 may obtain information related to a target point, which is configured as a reference point to perform the parking controlling, for stopping a vehicle in front of the personal garage.

The steering controller 30 may be configured to control the steering angle of the vehicle, and may include a steering wheel, an actuator operating together with the steering wheel, and a controller to control the actuator.

The braking controller 40 may be configured to control the braking of the vehicle, and may include a controller to control a brake.

The engine controller 50 may be configured to control the engine driving of the vehicle, and may include a controller to control the speed of the vehicle.

The user terminal 300 may transmit the garage parking request to the home link system 10, and may receive, from the home link system 10, status information on whether the parking is possible, whether the personal garage door is open or closed, or whether the parking of the vehicle is finished. In the instant case, the user terminal 300 may include a remote controller such as a smart key, a smartphone, a tablet personal computer (PC), a mobile phone, a video conference phone, an e-book reader, a netbook computer, a personal digital assistant (PDA), a portable multimedia player (PMP), a mobile communication terminal, a personal digital assistant (PDA), an electronic notebook, and may include all mobile devices that are able to internetwork with the home link system 10.

Figure 2:
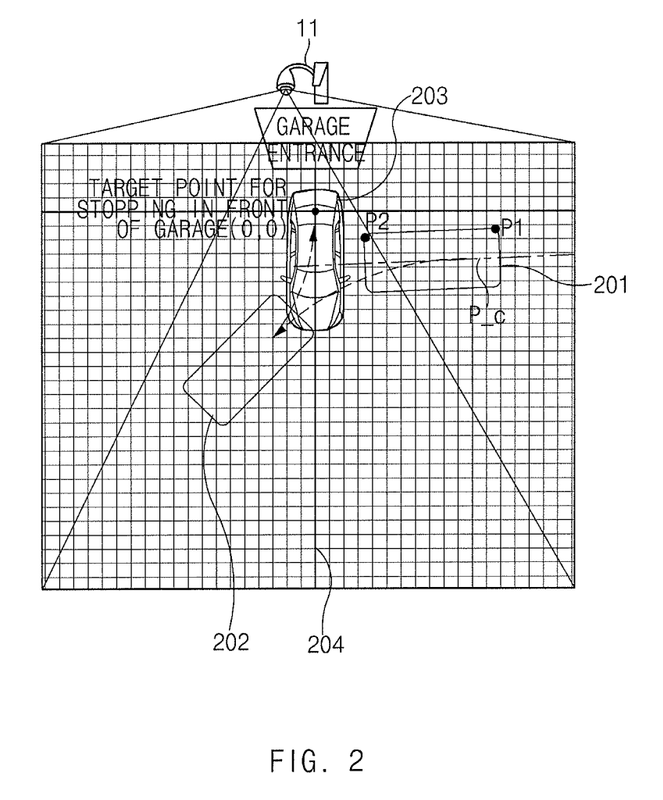
FIG. 2 is a view exemplarily illustrating road surface information obtained by mapping an image, which is used for automatic parking controlling, of a space in front of a garage with actual coordinates, according to an exemplary embodiment of the present invention.

FIG. 2 is a view exemplarily illustrating road surface information obtained by mapping an image, which is used for automatic parking controlling, of a space in front of a garage with actual coordinates, according to an exemplary embodiment of the present invention.

Referring to FIG. 2, the road surface information is obtained by mapping image data, which is captured by the camera 11, of a front portion of the garage with actual coordinates (world coordinates). In other words, the road surface information is stored by mapping image data of a basic space in front of a garage with actual coordinates based on the camera 11, which is fixed, with one-to-one correspondence. The current location of the vehicle is determined by use of coordinates of opposite end points P1 and P2 of the vehicle, which are viewed on the image data, and a relative angle is determined in which the relative angle is formed between a direction of a line segment linking the points P1 and P2 to each other and a direction of a garage entrance. In the instant case, the distances between the points P1 and P2 are equal to the total length of the vehicle, and the axle centerline P_c is determined based on the points P1 and P2, the total width and the total length of the vehicle. In other words, the home link system 10 determines the information (the coordinates of the points P1 and P2) of the current location of the vehicle, based on the target point for stopping in front of the garage, and the relative angle formed between the vertical line 204 extending perpendicularly from the target point for stopping in front of the garage and the axle centerline P_c of the vehicle, and transmits the information on the current position of the vehicle and the information on the relative angle of the vehicle to the vehicle system 20.

Accordingly, the vehicle system 20 may generate the parking path based on the information on the current location of the vehicle and the information on the relative angle of the vehicle. The vehicle moves forward along a parking path 202 from a current location 201 of the vehicle, moves backward to the front of the garage, and then is placed in front 203 of the garage.

As described above, when the vehicle drives along the parking path and is placed in front of the entrance of the personal garage, the home link system 10 recognizes, through the camera 11, that the vehicle is positioned in front of the entrance of the garage and controls the opening of the garage door.

Figure 3:
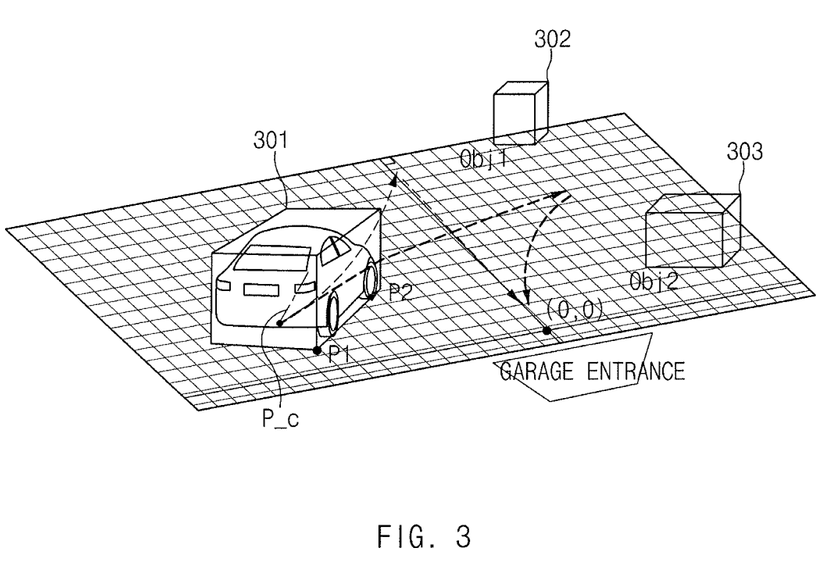
FIG. 3 is a view exemplarily illustrating road surface information used for automatically performing parking controlling when an obstacle is present, according to an exemplary embodiment of the present invention.

FIG. 3 is a view exemplarily illustrating road surface information used for automatically performing parking controlling when an obstacle is present, according to an exemplary embodiment of the present invention.

Referring to FIG. 3, when obstacles 302 and 303 are present around the parking path, the vehicle parking controlling apparatus 200 may correct the parking path or may temporarily stop the parking controlling to prevent the collision of the vehicle represented by an imaginary box 301 with the obstacles 302 and 303. In the instant case, the home link system 10 may transmit, to the vehicle system 20, obstacle coordinates (e.g., Obj1 and Obj2) based on a protrusion in front of the entrance of the garage.

Figure 4:
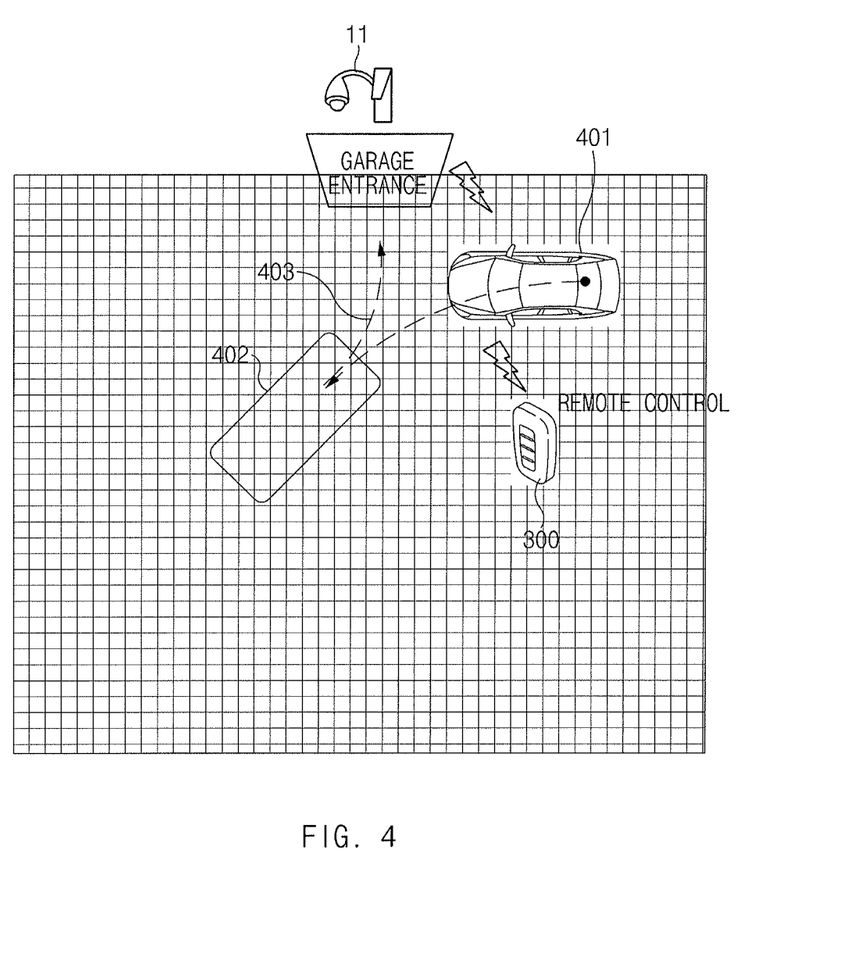
FIG. 4 is a view exemplarily illustrating an exemplary operation of personal garage controlling when an obstacle is absent, according to an exemplary embodiment of the present invention.
Figure 5:
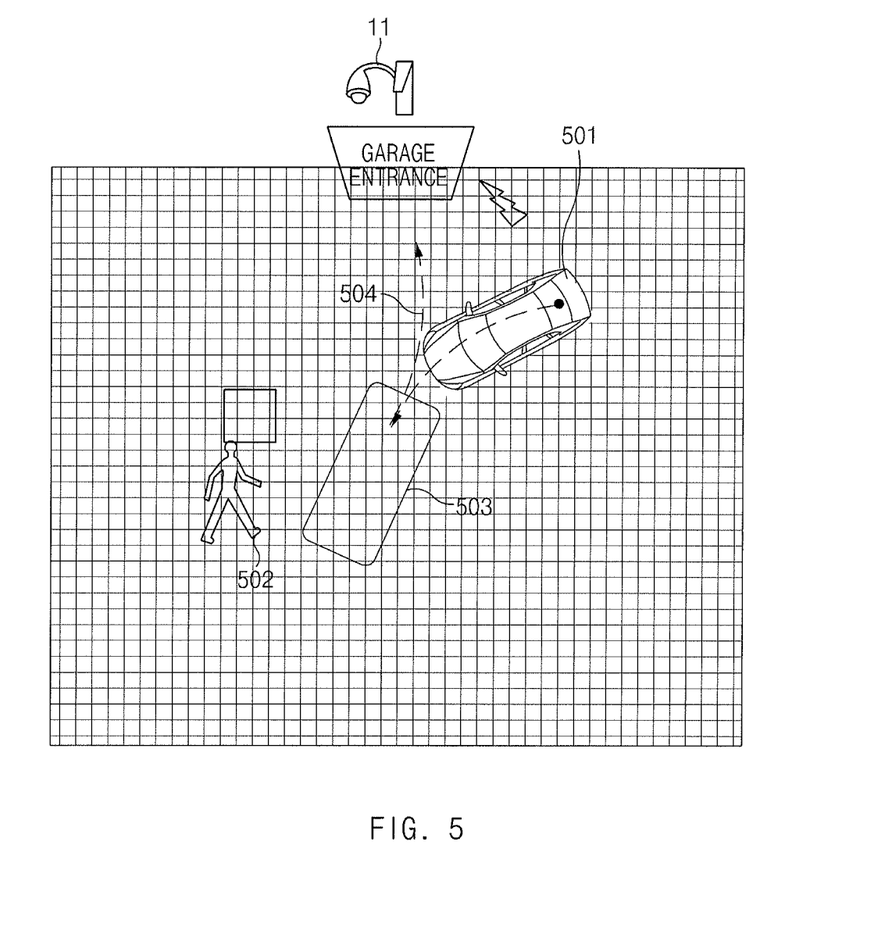
FIG. 5 is a view exemplarily illustrating an exemplary operation of personal garage controlling when an obstacle is present, according to an exemplary embodiment of the present invention.

FIG. 4 is a view exemplarily illustrating an exemplary operation of personal garage controlling when an obstacle is absent, according to an exemplary embodiment of the present invention, and FIG. 5 is a view exemplarily illustrating an exemplary operation of the garage controlling when an obstacle is present, according to an exemplary embodiment of the present invention.

Referring to FIG. 4, the vehicle parking controlling apparatus 200 performs vehicle parking controlling along parking paths 402 and 403 from a current location 401 when an obstacle is absent in a space on the parking paths. Referring to FIG. 5, the vehicle parking controlling apparatus 200 performs vehicle parking controlling along parking paths 503 and 504 from a current location 501 when an obstacle is present in a space on the parking paths.

Figure 6:
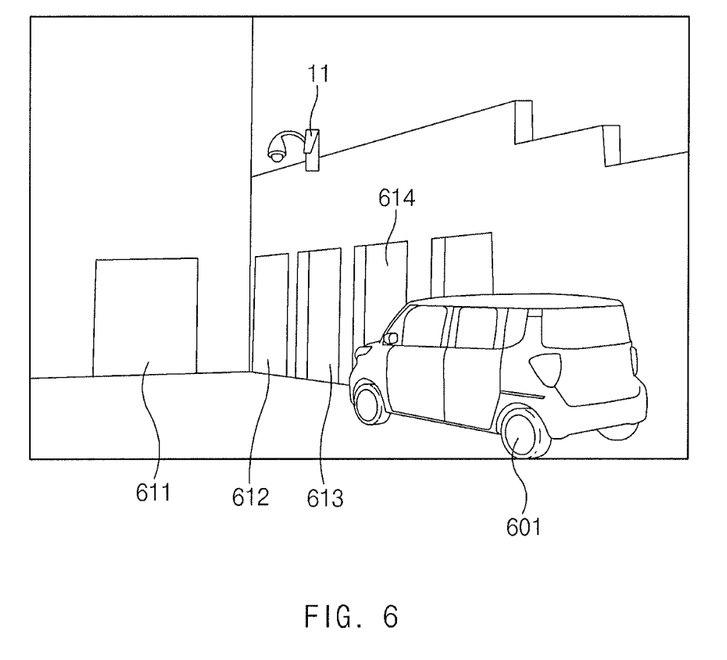
FIG. 6 is a view exemplarily illustrating that a plurality of personal garages are present, according to an exemplary embodiment of the present invention.
Figure 7:
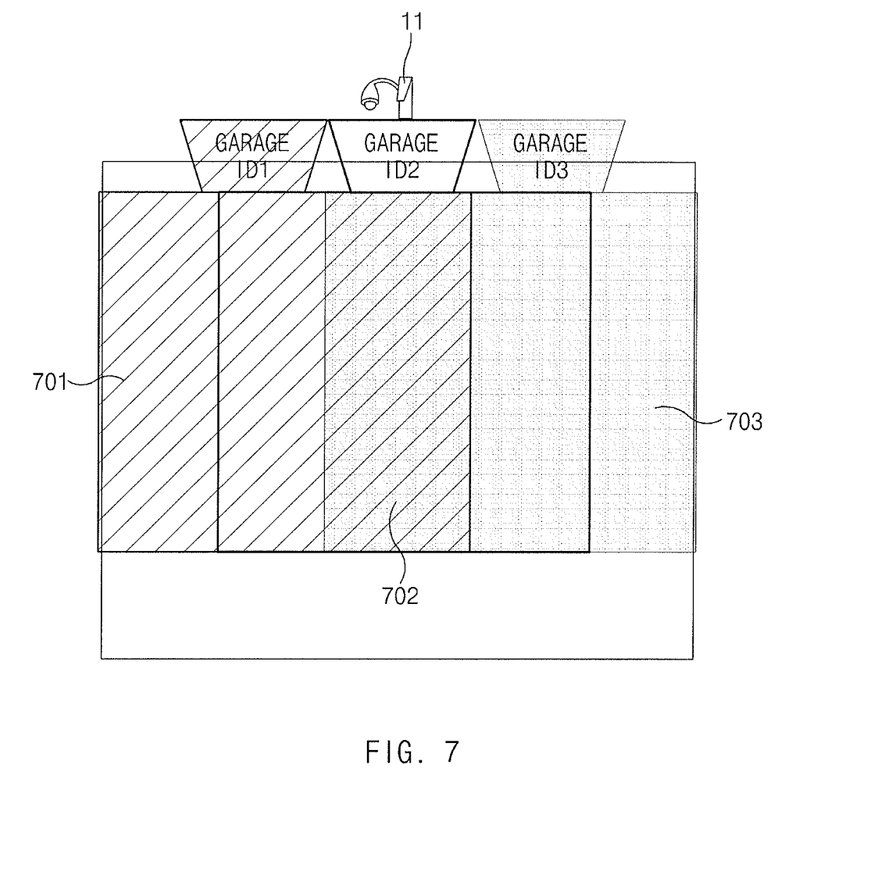
FIG. 7 is a view exemplarily illustrating an exemplary operation of automatic parking controlling for a plurality of personal garages, according to an exemplary embodiment of the present invention.

FIG. 6 is a view exemplarily illustrating that a plurality of personal garages are present, according to an exemplary embodiment of the present invention, and FIG. 7 is a view exemplarily illustrating an exemplary operation of the automatic parking controlling for the personal garages, according to an exemplary embodiment of the present invention.

Referring to FIG. 6, a plurality of garages 611, 612, 613, and 614 are present in front of a private residence, and the camera 11 is provided at an upper portion of the garages. In the instant case, each of the garages 611, 612, 613, and 614 is assigned with a garage ID for each user ID. When the home link system 10 receives a request for parking from the user terminal 300 as a vehicle 601 approaches near a relevant garage, the home link system 10 may receive information on a relevant user ID, may perform user authentication, and may perform parking controlling for a garage having a garage ID assigned to the user ID.

Referring to FIG. 7, the vehicle parking controlling apparatus 200 may perform parking controlling through regions of interest (ROI) 701, 702, and 703 based on garage IDs as the garage IDs are assigned to a plurality of garage entrances.

Figure 8:
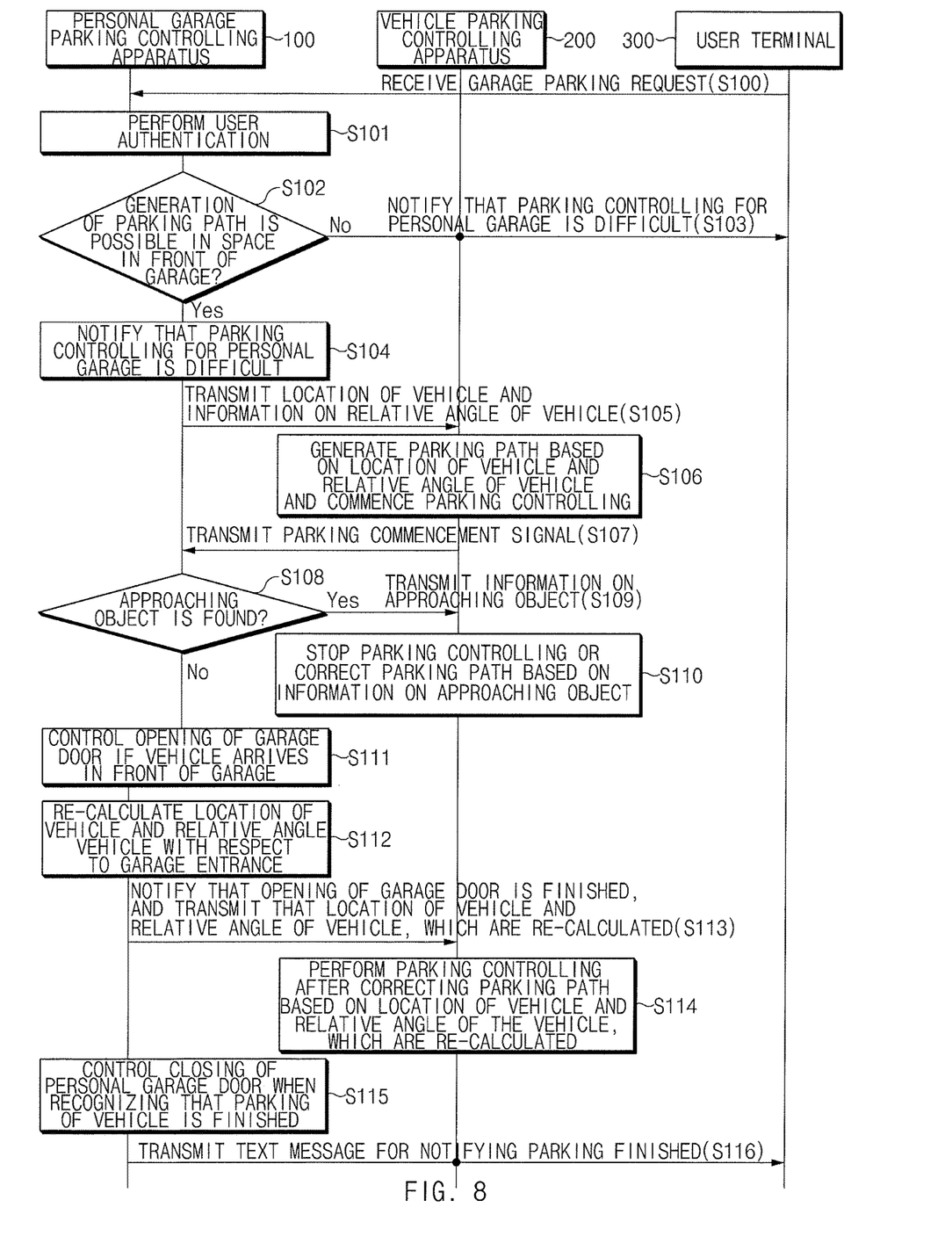
FIG. 8 is a flowchart illustrating a method for controlling parking of a vehicle in a personal garage by a home link system, according to an exemplary embodiment of the present invention.

Hereinafter, a method for controlling parking of a vehicle in a personal garage by the home link system, according to an exemplary embodiment of the present invention will be described with reference to FIG. 8. FIG. 8 is a flowchart illustrating the method for controlling the parking of the vehicle in the personal garage by the home link system, according to an exemplary embodiment of the present invention.

Hereinafter, it is assumed that the personal garage parking controlling apparatus 100 of FIG. 1 performs a processor of FIG. 8. Furthermore, in the following description made with reference to FIG. 8, it may be understood that the operation referred to as being performed by the personal garage parking controlling apparatus 100 is controlled by the processor 130 of the personal garage parking controlling apparatus 100 in the home link system 10.

Referring to FIG. 8, the personal garage parking controlling apparatus 100 performs user authentication (S101), when receiving a garage parking request from the user terminal 300 (S100). In the instant case, when the vehicle is located around a garage, even the vehicle parking controlling apparatus 200 may transmit the garage parking request as well as the user terminal 300.

The personal garage parking controlling apparatus 100 may determine whether previously stored user information for a relevant personal garage is matched with user information received from the user terminal 300 and may perform user authentication. Furthermore, the personal garage parking controlling apparatus 100 may perform the user authentication based on a garage ID and a user ID, because a garage ID is assigned to each garage, respectively, when a plurality of garages is present, such that parking controlling is performed for a garage having a garage ID corresponding to a user ID of a user requesting for parking the vehicle in the personal garage.

When the user authentication is finished, the personal garage parking controlling apparatus 100 determines whether the generation of a parking path is possible in a space in front of the personal garage (S102). In other words, the personal garage parking controlling apparatus 100 may determine whether an obstacle (an external vehicle, a bicycle, or a motorcycle) is present in the space in front of the personal garage and may determine that the generation of the parking path is possible when the obstacle is absent.

When the generation of the parking path is difficult in the space in front of the personal garage, the personal garage parking controlling apparatus 100 may notify, to the vehicle parking controlling apparatus 200 or the user terminal 300, that the parking controlling for the personal garage is difficult (S103).

When the generation of the parking path is possible in the space in front of the personal garage, the personal garage parking controlling apparatus 100 determines the location and the relative angle of the vehicle with respect to a garage entrance (S104) and transmits information on the location and the relative angle of the vehicle, which are determined, to the vehicle parking controlling apparatus 200 (S105).

Accordingly, the vehicle parking controlling apparatus 200 may generate the parking path based on the information on the location and the relative angle of the vehicle and may commence the parking controlling (S106). The vehicle parking controlling apparatus 200 transmits a parking commencement signal to the personal garage parking controlling apparatus 100 to commence the parking controlling after the generation of the parking path is completed (S107).

When the vehicle commences the parking, the personal garage parking controlling apparatus 100 detects, through the camera 11, whether there is present an object approaching the space in front of the personal garage (S108) and transmits information on the approaching object to the vehicle parking controlling apparatus 200 when the approaching object is found (S109). In the instant case, the information on the approaching object may include information on the type, the relative speed, the relative distance, and the expected colliding time of the approaching object. Accordingly, the vehicle parking controlling apparatus 200 may stop the parking controlling or may correct the parking path based on the information on the approaching object (S110). In other words, the vehicle parking controlling apparatus 200 may stop the parking controlling until the approaching object keeps moving and disappears, and may subsequently the parking controlling when the approaching object disappears. Furthermore, when the object approaches the personal garage to stop in front of the personal garage or when the approaching object slowly moves, the vehicle parking controlling apparatus 200 may correct the parking path to a path for avoiding the collision with the approaching object.

The personal garage parking controlling apparatus 100 controls the opening of the personal garage door when the vehicle arrives in front (an entrance) of the personal garage (S111). In the instant case, the personal garage parking controlling apparatus 100 may employ various manners for recognizing whether the vehicle arrives in front of the personal garage and recognizing the location of the vehicle, through the camera 11. Furthermore, the location of the vehicle arriving in front of the personal garage may indicate the state that the vehicle is immediately before entering the personal garage, as illustrated in reference 203 of FIG. 2. In the instant case, the personal garage parking controlling apparatus 100 recalculates the location and the relative angle of the vehicle with respect to the entrance of the personal garage, to determine whether the vehicle is configured to straightly enter the personal garage without collision.

The personal garage parking controlling apparatus 100 recalculates the location and the relative angle of the vehicle with respect to the entrance of the personal garage (S112), notifies that the opening of the personal garage door is finished, and transmits the location and the relative angle of the vehicle, which are recalculated, to the vehicle parking controlling apparatus 200 (S113). Accordingly, the vehicle parking controlling apparatus 200 may correct the parking path based on the location and the relative angle of the vehicle, which are recalculated, and may subsequently perform the parking controlling (S114). In the present case, when there is no variation in the location and the relative angle of the vehicle, which are recalculated, the personal garage parking controlling apparatus 100 only notifies that the opening of the personal garage door is finished without transmitting the location and the relative angle of the vehicle, which are recalculated, to the vehicle parking controlling apparatus 200. Accordingly, the vehicle parking controlling apparatus 200 may continuously perform parking controlling based on a previous parking path without correcting the parking path. In the instant case, the parking controlling may indicate controlling the parking of the vehicle in the personal garage.

The personal garage parking controlling apparatus 100 may control the closing of the personal garage door when recognizing that the parking of the vehicle is finished (S115) and may transmit, to the vehicle parking controlling apparatus 200 and/or the user terminal 300, that the parking of the vehicle is finished (S116). In the instant case, the personal garage parking controlling apparatus 100 may recognize, through the internal camera of the personal garage, that the parking of the vehicle is finished. However, the personal garage parking controlling apparatus 100 may recognize that the parking of the vehicle is finished in various manners.

As described above, FIG. 8 illustrates an exemplary embodiment of automatically performing the personal garage parking controlling by determining vehicle parking information (a location of the vehicle, the relative angle of the vehicle, or the like) by the personal garage parking controlling apparatus 100 of the home link system 10. Accordingly, the personal garage parking controlling is automatically performed through the internetworking between the home link system 10 and the vehicle system 20, increasing the convenience of the user.

Figure 9:
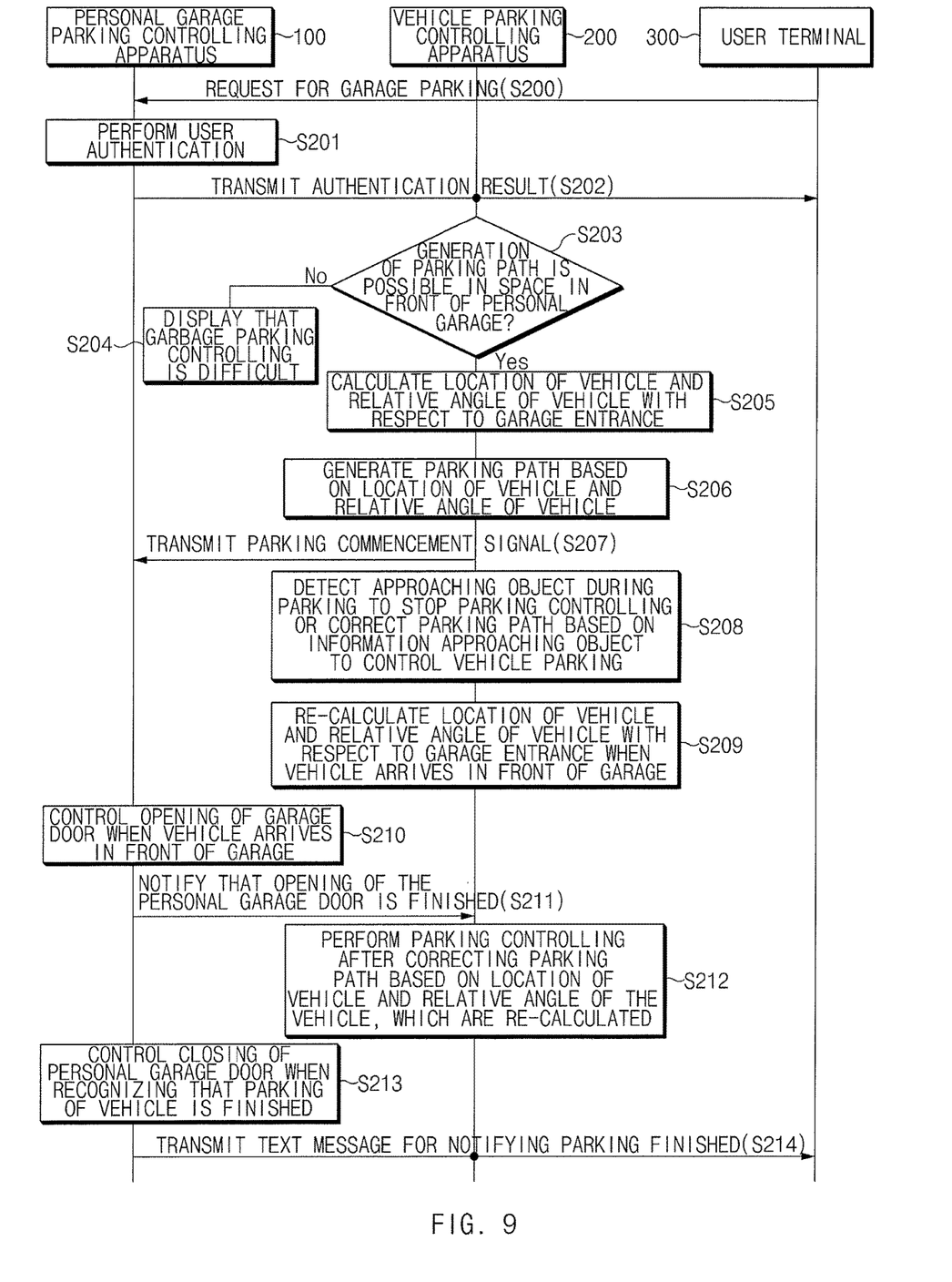
FIG. 9 is a flowchart illustrating a method for controlling parking in a personal garage by a vehicle system, according to an exemplary embodiment of the present invention.

Hereinafter, a method for controlling parking in a personal garage by a vehicle system, according to an exemplary embodiment of the present invention will be described with reference to FIG. 9. FIG. 9 is a flowchart illustrating the method for controlling parking in the personal garage by the vehicle system, according to an exemplary embodiment of the present invention.

Hereinafter, it is assumed that the vehicle parking controlling apparatus 200 of FIG. 1 performs a processor of FIG. 9. Furthermore, in the following description made with reference to FIG. 9, it may be understood that the operation referred to as being performed by the vehicle parking controlling apparatus 200 is controlled by the processor 240 of the vehicle parking controlling apparatus 200.

Referring to FIG. 9, the user terminal 300 transmits a signal for the garage parking request to the personal garage parking controlling apparatus 100 (S200). In the instant case, the vehicle parking controlling apparatus 200 of the vehicle system 20 may transmit the signal for the garage parking request to the personal garage parking controlling apparatus 100.

The personal garage parking controlling apparatus 100 may determine whether previously stored user information for a relevant personal garage is matched with user information received from the user terminal 300 and may perform user authentication (S201). Furthermore, the personal garage parking controlling apparatus 100 may perform the user authentication based on a garage ID and a user ID because a garage ID is assigned to each garage, respectively, when a plurality of garages is present, and may perform parking controlling for a garage having a garage ID corresponding to a user ID of a user requesting for parking the vehicle in the personal garage.

When the user authentication is finished, the personal garage parking controlling apparatus 100 may transmit, to the vehicle parking controlling apparatus 200 and/or the user terminal 300, a user authentication result (S202).

The vehicle parking controlling apparatus 200 determines whether the generation of the parking path is possible in a space in front of the personal garage (S203). In other words, the vehicle parking controlling apparatus 200 may determine whether an obstacle (an external vehicle, a bicycle, or a motorcycle) is present in the space in front of the personal garage and may determine that the generation of the parking path is possible when the obstacle is absent.

When the generation of the parking path is difficult in the space in front of the personal garage, the vehicle parking controlling apparatus 200 may display that the garage parking controlling is difficult (S204).

When the generation of the parking path is possible in the space in front of the personal garage, the vehicle parking controlling apparatus 200 determines the location and the relative angle of the vehicle with respect to a garage entrance (S205), generates the parking path based on the information on the location and the relative angle of the vehicle, which are determined, and may commence the parking controlling (S206). The vehicle parking controlling apparatus 200 transmits a parking commencement signal to the personal garage parking controlling apparatus 100 to commence the parking controlling after the generation of the parking path is generated (S207).

When the vehicle commences the parking, the vehicle parking controlling apparatus 200 detects, through the sensor module 21, whether there is present an object approaching the space in front of the personal garage and corrects the parking path based on the information on the approaching object when the approaching object is found (S208). In the instant case, the information on the approaching object may include information on the type of the approaching object, the relative speed of the approaching object, the relative distance of the approaching object, and the expected colliding time of the approaching object. In the instant case, the personal garage parking controlling apparatus 100 having received the parking commencement signal may detect the approaching object and may provide the detection result to the vehicle parking controlling apparatus 200.

In other words, the vehicle parking controlling apparatus 200 may stop the parking controlling until the approaching object keeps moving and disappears, and may subsequently the parking controlling when the approaching object disappears. Furthermore, when the object approaches the personal garage to stop in front of the personal garage or when the approaching object slowly moves, the vehicle parking controlling apparatus 200 may correct the parking path to a path for avoiding the collision with the approaching object.

The vehicle parking controlling apparatus 200 may recalculate the location and the relative angle of the vehicle with respect to the entrance of the personal garage, when the vehicle arrives in front of the personal garage (S209). In the instant case, the personal garage parking controlling apparatus 100 controls the opening of the personal garage door when the vehicle arrives in front (at the entrance) of the personal garage (S210) and transmits, to the vehicle parking controlling apparatus 200, the notification that the opening of the personal garage door is finished (S211). In the instant case, the personal garage parking controlling apparatus 100 may employ various manners for recognizing whether the vehicle arrives in front of the personal garage and recognizing the location of the vehicle, through the camera 11. Furthermore, the location of the vehicle arriving in front of the personal garage may indicate the state that the vehicle is immediately before entering the personal garage, as illustrated in reference 203 of FIG. 2. In the instant case, the personal garage parking controlling apparatus 100 recalculates the location and the relative angle of the vehicle with respect to the entrance of the personal garage, to determine again whether the vehicle is configured to straightly enter the personal garage without collision.

Accordingly, the vehicle parking controlling apparatus 200 may correct the parking path based on the location and the relative angle of the vehicle, which are recalculated, and may continuously perform the parking controlling (S212). In the instant case, when there is no variation in the location and the relative angle of the vehicle, which are recalculated, the parking controlling may be continuously performed based on a previous parking path without correcting the parking path. In the instant case, the parking controlling may indicate controlling the parking of the vehicle in the personal garage.

The personal garage parking controlling apparatus 100 may control the closing of the personal garage door when recognizing that the parking of the vehicle is finished (S213) and may transmit, to the vehicle parking controlling apparatus 200 and/or the user terminal 300, that the parking of the vehicle is finished (S214). In the instant case, the personal garage parking controlling apparatus 100 may recognize, through the internal camera of the personal garage, that the parking of the vehicle is finished. However, the personal garage parking controlling apparatus 100 may recognize that the parking of the vehicle is finished in various manners.

As described above, FIG. 9 illustrates a feature of automatically performing the personal garage parking controlling by determining vehicle parking information (a location of the vehicle, the relative angle of the vehicle, or the like) by the vehicle parking controlling apparatus 200 of the vehicle system 20. Furthermore, the automatic parking in the personal garage is controlled through the internetworking between the home link system 10 and the vehicle system 20, increasing the convenience of the user.

As described above, the present invention may remove the inconvenience that a user has to limitedly stop a vehicle at a specified position for the parking in a personal garage and the inconvenience that the user has to personally open a garage door and search for a parking space for automatic parking in the personal garage. Furthermore, according to an exemplary embodiment of the present invention, the parking path may be generated based on the information on the relationship in position between a garage and a vehicle and information on a surrounding obstacle by use of a camera mounted in the garage, may detect an approaching obstacle based on the image captured by the camera mounted in the garage during parking controlling, and may cope with the collision during the parking of the vehicle in advance by use of relevant information. Furthermore, according to an exemplary embodiment of the present invention, the occupation of the space, which is necessary for parking in front of the garage, without permission may be prevented through the internetworking with the home link system.

Figure 10:
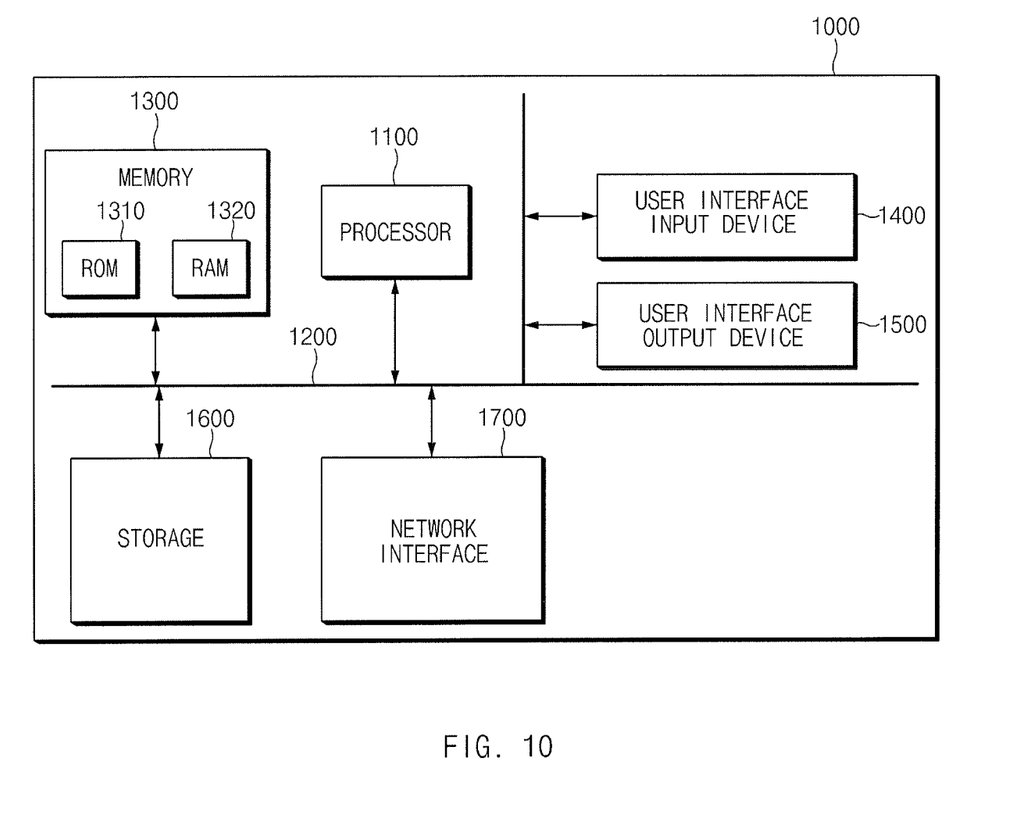
FIG. 10 illustrates a computing system, according to an exemplary embodiment of the present invention.

FIG. 10 illustrates a computing system, according to an exemplary embodiment of the present invention.

Referring to FIG. 10, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments included In an exemplary embodiment of the present invention may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. A. Alternatively, the storage medium may be integrated with the processor 1100. The processor and storage medium may reside in an application specific integrated circuit (ASIC). The ASIC may reside in a user terminal. A. Alternatively, the processor and storage medium may reside as separate components of the user terminal.

As described above, according to an exemplary embodiment of the present invention, as the vehicle system and the home link system operate together, the parking of the vehicle in the personal garage may be automatically controlled, increasing the convenience of the user.

Besides, a variety of effects directly or indirectly understood through the present invention may be provided.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A personal garage parking controlling apparatus in a personal garage, the apparatus comprising:
a processor configured to:
determine when generation of a parking path is configured to be performed in a space around a garage, in receiving a request for parking of a vehicle from the vehicle in the garage;
determine vehicle parking information when the generation of the parking path is configured to be performed;
provide a determined vehicle parking information to the vehicle; and
control opening or closing of a garage door of the garage, based on the determined vehicle parking information; and
a storage connected to the processor and storing image data of a surrounding environment of the garage and the determined vehicle parking information, in the storage.

2. The apparatus of claim 1, wherein the processor is further configured to:
detect when an object approaching the garage is present around the garage, in receiving a parking commencement signal from the vehicle; and
provide, to the vehicle, approaching information related to the object when the object approaching the garage is detected.

3. The apparatus of claim 1, wherein the processor is further configured to:
control the opening of the garage door when the vehicle arrives at an entrance of the garage; and
control the closing of the garage door when parking of the vehicle is finished in the garage.

4. The apparatus of claim 1, wherein the processor is further configured to:
recalculate the vehicle parking information; and
provide a result of recalculating the vehicle parking information to the vehicle,
when the vehicle arrives at an entrance of the garage.

5. The apparatus of claim 1, wherein the processor is further configured to:
transmit a text message for a notification to a user terminal when the generation of the parking path is not possible or the parking of the vehicle is finished.

6. The apparatus of claim 1, wherein the vehicle parking information includes:
information on a current location of the vehicle and a relative angle of the vehicle based on a vertical line extending from an entrance of the garage.

7. The apparatus of claim 1, wherein the processor is further configured to:
determine when the generation of the parking path is configured to be performed, depending on when an obstacle is present in the space around the garage.

8. The apparatus of claim 1, wherein the processor is further configured to:

perform user authentication by use of an identifier (ID) of each garage and an ID of each user, when a plurality of garages is provided.

9. An apparatus comprising:
a processor configured to:
  determine when generation of a parking path for a vehicle is configured to be performed in a space around a garage;
  determine vehicle parking information when the generation of the parking path is configured to be performed;
  generate the parking path based on the vehicle parking information; and
  control parking of the vehicle, based on a generated parking path; and
a storage connected to the processor and configured to store the vehicle parking information and the generated parking path in the storage,
wherein the vehicle parking information includes information on a current location of the vehicle and a relative angle formed between a vertical line extending perpendicularly from a target point for stopping in front of the garage and a centerline of the vehicle.

10. The apparatus of claim 9, further including:
a display connected to the processor and configured to display a notification when the generation of the parking path is not possible or when the parking of the vehicle is finished.

11. The apparatus of claim 9, wherein the processor is further configured to:
notify commencement of parking controlling by transmitting a parking commencement signal to a device which controls opening of a garage door of the garage, when commencing the parking controlling.

12. The apparatus of claim 11, wherein the processor is further configured to:
detect when an object approaching the garage is present around the garage, after the parking controlling is commenced; and
correct the generated parking path or stop the parking controlling, when the object approaching the garage is detected.

13. The apparatus of claim 9, wherein the processor is further configured to:
recalculate the vehicle parking information; and
correct the generated parking path, when the vehicle arrives at an entrance of the garage.

14. The apparatus of claim 9, wherein the processor is further configured to:
determine when the generation of the parking path is configured to be performed, depending on when an obstacle is present in the space around the garage.

15. A method for controlling parking of a vehicle in a garage, the method comprising:
receiving, by a processor, a request for the parking in the garage;
determining, by the processor, when generation of a parking path is configured to be performed in a space around the garage;
determining, by the processor, vehicle parking information when the generation of the parking path is configured to be performed;
providing, by the processor, the vehicle parking information to the vehicle; and
controlling, by the processor, opening of a garage door of the garage, based on the vehicle parking information when the vehicle arrives in a front of the garage,
wherein the determining of the vehicle parking information includes determining information on a current location of the vehicle and a relative angle formed between a vertical line extending perpendicularly from a target point for stopping in front of the garage and a centerline of the vehicle.

16. The method of claim 15, further including:
performing, by the processor, user authentication when the request for the parking in the garage is received.

17. The method of claim 15, wherein the determining of when the generation of the parking path is configured to be performed includes:
determining when the generation of the parking path is configured to be performed, depending on when an obstacle is present in the space around the garage.

18. The method of claim 15, further including:
controlling, by the processor, the opening of the garage door of the garage when the vehicle arrives at an entrance of the garage;
recalculating, by the processor, the vehicle parking information;
providing, by the processor, the vehicle parking information to the vehicle; and
controlling, by the processor, closing of the garage door of the garage when the parking of the vehicle is finished in the garage.

* * * * *